US012604815B1

(12) United States Patent (10) Patent No.: US 12,604,815 B1
Ahmed (45) Date of Patent: Apr. 21, 2026

(54) DECORATIVE DISPLAY APPARATUSES

(71) Applicant: Syed Ahmed, Pearland, TX (US)

(72) Inventor: Syed Ahmed, Pearland, TX (US)

( * ) Notice: Subject to any disclaimer, the term of this patent is extended or adjusted under 35 U.S.C. 154(b) by 0 days.

(21) Appl. No.: 18/438,213

(22) Filed: Feb. 9, 2024

(51) Int. Cl.
  *A01G 9/02* (2018.01)
  *G09F 7/00* (2006.01)
  *G09F 23/00* (2006.01)

(52) U.S. Cl.
  CPC ............. *A01G 9/0302* (2025.01); *G09F 7/00* (2013.01); *G09F 23/00* (2013.01)

(58) Field of Classification Search
  CPC ............................... A01G 9/028; A01G 9/0302
  See application file for complete search history.

(56) References Cited

U.S. PATENT DOCUMENTS

| | | | | | |
|---|---|---|---|---|---|
| 4,196,542 | A | * | 4/1980 | West | A01G 9/12 |
| | | | | | 428/17 |
| 4,616,304 | A | * | 10/1986 | Von Kohorn | F21V 33/0028 |
| | | | | | 362/101 |
| 5,511,342 | A | * | 4/1996 | Maso | A01G 9/023 |
| | | | | | 47/86 |
| 5,577,344 | A | * | 11/1996 | Zaremba | A47G 7/041 |
| | | | | | 108/150 |
| 6,079,154 | A | * | 6/2000 | Farwell | A01G 9/02 |
| | | | | | 47/41.12 |
| 6,298,599 | B1 | * | 10/2001 | Weiner | A01G 9/02 |
| | | | | | 47/65.5 |

| | | | | | |
|---|---|---|---|---|---|
| 6,698,136 | B1 | * | 3/2004 | Cleveland | A01G 9/0295 |
| | | | | | 47/39 |
| 9,414,548 | B1 | * | 8/2016 | McCreary | A01G 9/026 |
| 10,091,949 | B2 | * | 10/2018 | Angheloiu | A01G 9/28 |
| 11,096,343 | B1 | * | 8/2021 | Farmer | H04N 7/183 |
| 11,343,975 | B2 | * | 5/2022 | Van Helleputte | A01G 9/021 |
| 2012/0117871 | A1 | * | 5/2012 | Luckett | A01G 9/023 |
| | | | | | 47/65.7 |
| 2015/0027047 | A1 | * | 1/2015 | Roberts | A01G 9/28 |
| | | | | | 47/65.5 |
| 2019/0297800 | A1 | * | 10/2019 | McNestry | A01G 27/003 |

FOREIGN PATENT DOCUMENTS

| | | | | | |
|---|---|---|---|---|---|
| CA | 2565023 | A1 | * | 4/2008 | A01G 9/28 |
| CA | 2771217 | A1 | * | 2/2011 | G09F 19/22 |
| CN | 105580660 | A | * | 5/2016 | A01G 27/02 |
| CN | 108432490 | A | * | 8/2018 | A01C 23/044 |
| CN | 114793680 | A | * | 7/2022 | |
| CN | 115140404 | A | * | 10/2022 | A01G 22/55 |
| GB | 2187092 | A | * | 9/1987 | G09F 23/00 |
| GB | 2373723 | A | * | 10/2002 | A01G 5/04 |
| KR | 100454261 | B1 | * | 10/2004 | A01G 9/028 |
| KR | 20110001793 | U | * | 2/2011 | A01G 9/027 |
| TW | 1565405 | B | * | 1/2017 | |

* cited by examiner

*Primary Examiner* — Magdalena Topolski

(57) ABSTRACT

A body shaped in the form of a decorative element and a drainage receptacle embedded within the body. The body may comprise a cavity and a channel. The cavity may be configured to hold a planter therein, and the cavity may be positioned near a top part of the body. The channel may be connected to an opening of the cavity, wherein the channel extends down to a lower part of the body. The drainage receptacle may be configured to hold a liquid.

12 Claims, 5 Drawing Sheets

100

100

107

112

105

110

120

130

200

300

400

413

414

412

410

500

600

DECORATIVE DISPLAY APPARATUSES

BACKGROUND

In the realm of decor and gardening, various products are used for elevating visual aesthetics and incorporating natural elements into diverse settings. Decorative items such as letters, words, symbols, and horticultural elements like plants and flowers play a vital role in artistic expression and beautifying spaces. These elements may be integrated together for both aesthetic and functional purposes.

BRIEF DESCRIPTION OF THE DRAWINGS

The present description will be understood more fully when viewed in conjunction with the accompanying drawings of various examples of decorative display apparatuses. The description is not meant to limit the decorative display apparatus to the specific examples. Rather, the specific examples depicted and described are provided for explanation and understanding of decorative display apparatuses. Throughout the description the drawings may be referred to as drawings, figures, and/or FIGs.

DETAILED DESCRIPTION

Figure 1:
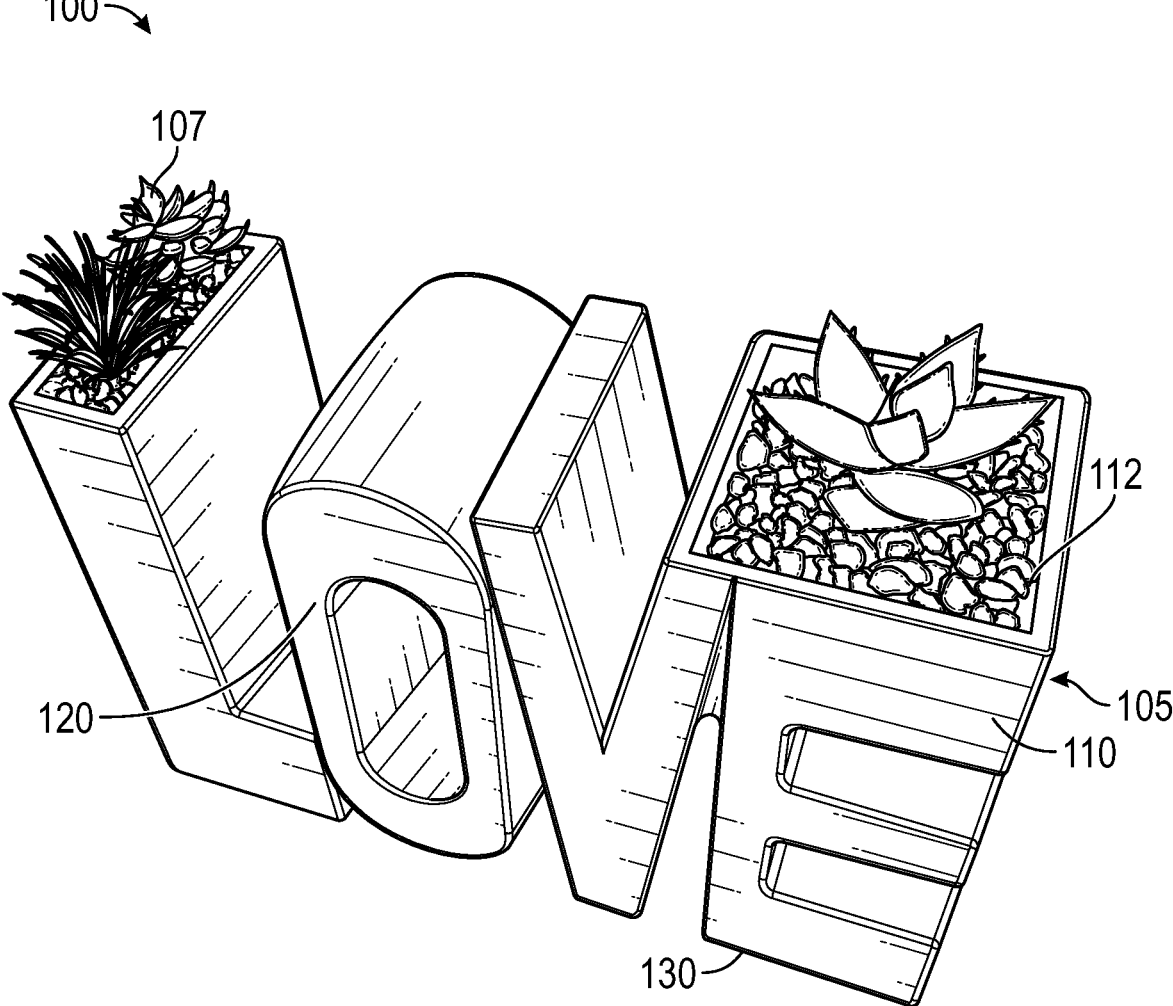
FIG. 1 is a perspective view of a decorative display apparatus, according to an embodiment.

A decorative display apparatus disclosed herein will become better understood through a review of the following detailed description in conjunction with the figures. The detailed description and figures provide merely examples of the various embodiments of decorative display apparatuses. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

In the realm of traditional planters, a conventional planter may include a simple structure consisting of a container for holding soil and a plant. These planters lack advanced features and often neglect considerations for optimal plant health and aesthetic versatility. Typically, they are designed with a standard structure that does not offer much flexibility or creativity in arranging plants. The absence of advanced functionalities, designs, and attention to plant care specifics characterizes the current state of conventional planters.

Despite being widely used, conventional planters pose several challenges and miss opportunities for enhanced functionality and visual appeal. Problems associated with standard planters include limitations in soil capacity, inadequate drainage systems, and a lack of adaptability for diverse plant arrangements. Additionally, conventional planters may not consider the aesthetic aspects of plant presentation, limiting their use for decorative purposes. The current state of the art does not fully address these issues, leaving room for improvements that can provide a more sophisticated and effective solution for plant care and display.

Implementations of a planter system may address some or all of the problems described above. A planter system, such as the one disclosed, may include features like an interlocking design, customizable configurations, and built-in drainage systems. This addresses challenges associated with stability, adaptability, and proper plant care. The disclosed embodiment includes a planter system that goes beyond the limitations of conventional planters and provides a versatile and user-friendly system for creative plant arrangements while prioritizing optimal plant health.

The disclosed embodiment addresses problems and opportunities by introducing an interlocking planter system that allows users to create unique and visually appealing arrangements. With detachable and customizable elements, users can experiment with different shapes, words, or themes. The integrated drainage system provides proper water management and prevents issues related to overwatering and waterlogging. The disclosed embodiment not only addresses existing problems in conventional planters but also provides opportunities for users to express creativity and cultivate plants in a more effective and aesthetically pleasing manner.

FIG. 1 is a perspective view of a decorative display apparatus 100, according to an embodiment. The decorative display apparatus 100 presents a visually appealing and adaptable decorative element 105 configured to hold one or more horticultural elements 107, such as plants (artificial and real), flowers (artificial and real), soil, decorative rocks, and the like. The decorative element 105 may be shaped in the form of an alphanumeric character (e.g., letter or number), a word, a design, a symbol, an emblem, an image, or any other visually distinctive element.

According to various embodiments, the decorative display apparatus 100 may include a first body 110 configured in the shape of the decorative element 105, a second body 120 configured to connect to the first body 110 for creating a cohesive visual display when the first body 110 is connected to the second body 120. The decorative display apparatus 100 may also include a drainage receptacle 130 attachable to a lower end of the first body 110 or second body 120, proximal to a supporting surface on which the decorative display 100 rests.

For example, in the case where the first body 110 is shaped in the form of an alphanumeric character, such as a letter, the cavity 112 may be positioned at the top of the letter. The cavity 112 may be embedded within the uppermost portion of the first body 110. The cavity 112 may be in alignment with an upper edge or surface of the letter-shaped structure. By doing so, the cavity 112 becomes an integral part of the letter's design and is integrated into the overall structure. This positioning at the top not only maintains the aesthetic coherence of the letter but also serves functional purposes, such as preventing dislodgment and spillage of the contents while allowing for visibility and presentation of the plant or decorative elements within the cavity 112. The contents may include a planter, including a plant, soil, decorative rocks, and other contents.

The depth of the cavity 112 may be chosen to optimize plant health and growth. In an embodiment, the depth may be greater than or equal to 1.7 centimeters, providing sufficient space for the plant's roots to establish and flourish. This depth ensures that the plant's roots have ample room for spreading and development, thereby significantly contributing to the overall well-being and longevity of the plant within the decorative apparatus 100. A deeper cavity allows for adequate soil volume, which may enhance nutrient absorption and water retention. Additionally, a deeper cavity may effectively stabilize the plant, mitigating the risk of the decorative display apparatus 100 tipping or becoming unstable.

The second body 120 may be configured to connect with the first body 110 to enable a user to form a visual display. In an embodiment, the first body 110 can be shaped in the form of a complete word, while the second body 120 can be shaped in the form of another word, allowing them to be interconnected to convey a sentence or message. Alternatively, each body may be shaped as an individual letter, and these letters can be detached to form an innovative interlocking planter system. This configuration permits users to rearrange the bodies to display a personalized decorative arrangement, spelling out various words or phrases like "love," "grow love," "share love," or "love blooms."

Each body can be combined to create a visual display representing words. Users have the flexibility to experiment with alphabet arrangements, utilizing each body to represent a letter and spell out names, initials, or any desired letter sequence. In another embodiment, each body may take the form of a numerical digit, allowing users to create inventive displays of numerical sequences or significant dates. The bodies can also be shaped in the form of symbolic elements or shapes, allowing users to create artistic and visually expressive arrangements. In yet another embodiment, the bodies can take the form of symbols, enabling users to create décor with different seasons throughout the year.

Figure 2:
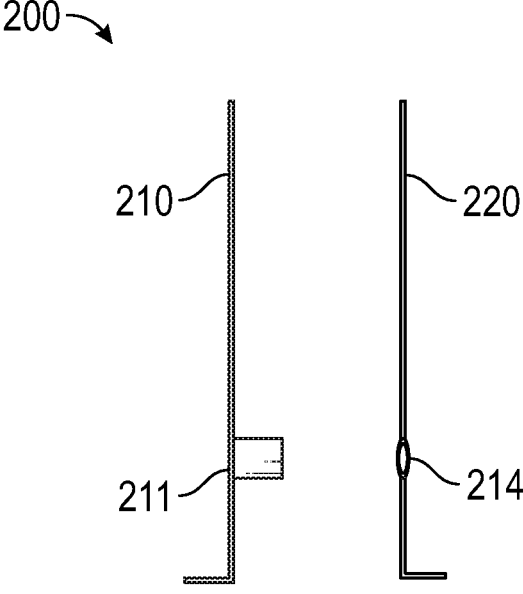
FIG. 2 illustrates a side view of a decorative display apparatus, according to an embodiment.

FIG. 2 illustrates a side view of a decorative display apparatus 200, including a first body 210, a second body 220, and a connection mechanism, according to an embodiment. The bodies may connect to each other through various connection mechanisms. In an embodiment, the first body 210 may include a first connector 211 with a protrusion, while the second body 220 may include a second connector 214 with a corresponding recessed groove. This embodiment allows the first and second connectors 211, 214 to mateably engage, forming a secure snap-fit assembly. In another embodiment, the first connector 211 may include a first magnet, and the second connector 214 may include a magnetic receptive surface as its connector. The magnetic properties enable the first and second connectors 211, 214 to mateably engage. In yet another embodiment, each body may include mateably engageable clips.

Figure 3:
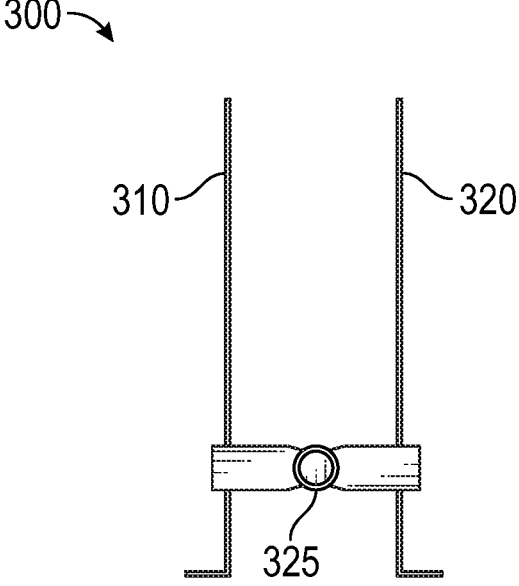
FIG. 3 illustrates a side view of a decorative display apparatus, according to an embodiment.

FIG. 3 illustrates a side view of a decorative display apparatus 300, including a first body 310 connected to a second body 320, according to an embodiment. Specifically, the first body 310 may be connected or linked to the second body 320 through an articulating joint 325. The articulating joint 325 may be configured to couple the first body 310 to the second body 320. The articulating joint 325 enables the connected first and second bodies to be moved at various angles relative to each other to form the visual display in various shapes. The articulating joint 325 may include a ball and socket joint, swivel joint, magnetic connector, articulating hinge, universal joint, and similar mechanisms. These mechanisms provide versatile ways for the bodies to connect allowing for dynamic and adaptable configurations. For instance, the ball and socket joint may provide flexibility in multiple directions, the swivel joint may enable rotation around a fixed point, magnetic connectors may permit flexible and adjustable connections, articulating hinges may enable connection at various angles, and universal joints may provide rotation around two axes. For example, users can arrange the bodies to form interconnected shapes like hearts, stars, or geometric patterns, and other visually appealing and thematic displays. Various patterns may be formed by connecting the bodies at different angles, thereby allowing for configurations that resemble waves, spirals, or symmetrical designs.

Figure 4:
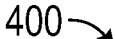
FIG. 4 is a top-down view of a decorative display apparatus, according to an embodiment.

FIG. 4 is a top-down view of a decorative display apparatus 400, according to an embodiment. Specifically, the decorative display apparatus 400 may include a body 410 with a cavity 412 positioned near the top of the body 410. The cavity 412 may include an opening 413 connected to a channel 414. The channel 414 may be integrated as part of the body 410 or be a separate element, such as a tube, connected to the opening 413 and extending down to a lower end of the body 410, proximal to the supporting surface on which the decorative display 400 rests. The placement of the cavity 412 may provide several advantages, including preventing the dislodgment of the plant, soil, decorative rocks, or other contents contained within the cavity 412. Additionally, the elevated placement of the cavity 412 near a top part of the body 410 may optimize plant growth. For instance, delicate flowers and foliage contained with the cavity 410 are less susceptible to damage or displacement. Additionally, placing the cavity 412 near the top stabilizes the plant, minimizing the risk of spillage and preserving the aesthetic arrangement of decorative elements while reducing the likelihood of soil spillage. In an embodiment, the cavity 412 may include an open top where the plant can grow. In another embodiment, the cavity 412 may be enclosed with a cover having a small opening to allow a plant to pass through the opening.

The cavity 412 may include four walls. In an embodiment, two walls may be perpendicular to each other and slanted or inclined, while the other two walls remain straight. These walls are slanted or inclined so that they tilt inwards, effectively reducing the volume of the cavity 412. The inwardly inclined walls may minimize excess space and provide a snug fit for the planter within the cavity 412. Additionally, the inclined walls may guide fluid (e.g., water) that is not absorbed in the soil. The slanted walls direct excess water down to the bottom of the cavity 412 through the opening 413 at the bottom of the cavity 412 linked to a channel leading to a drainage receptacle. Accordingly, any surplus water, which could potentially lead to waterlogging, is efficiently channeled away from the plant's root system. The inclined walls thus contribute to maintaining optimal moisture levels in the soil and therefore provide a healthy environment for the planter.

The cavity's walls may include hydrophobic, anti-stain, non-toxic ceramic, nano-coating, polymer, or easy-clean epoxy coatings. For instance, a hydrophobic coating can be applied to make the walls water-resistant, repelling water and preventing soil particles from sticking for easy cleaning. A stain-resistant coating can be applied to create a protective barrier, preventing permanent stains and facilitating easy maintenance. A non-toxic ceramic coating can be applied to provide a smooth, safe, and easy-to-clean surface. Polymer coatings can be applied to resist dirt adhesion, simplifying wall cleaning. An epoxy coating can be applied to provide a smooth and resistant surface that is easy to wipe or rinse for easy cleaning. Additionally, nano-coating technology can be applied to form a thin protective layer for repelling dirt and water.

In an embodiment, the decorative display apparatus 400 may include a sensor system integrated within the body 410 and a communication module configured for wireless data transmission. The sensor system may include one or more sensors positioned within the cavity 412 or integrated within the walls of the cavity 412 and may be configured to detect soil moisture levels and transmit data to a user device via the communication module. The integrated sensor system within the decorative display apparatus 400 operates by detecting soil moisture levels within the cavity 412. The sensor(s) gauge the moisture content of the soil and provide real-time data on the plant's hydration status. This information may be transmitted to a user device through the apparatus's communication module. Users can conveniently monitor and receive updates on the soil moisture levels remotely. Additionally, in an embodiment, the cavity 412 may include a reservoir with a valve configured to regulate, control, or stop the flow of a fluid, such as water. By placing a valve in the water supply line from the reservoir to the plant, users can effectively manage and control the water flow to the plant contained within the cavity 412. The sensor system may improve the effectiveness of plant care by allowing users to create and sustain the environment for plant growth and health.

Figure 5:
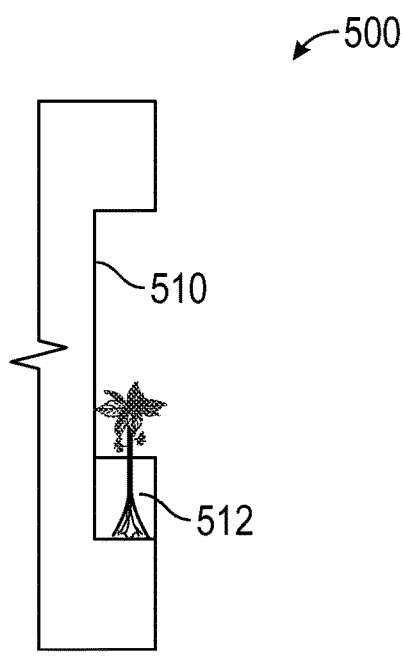
FIG. 5 illustrates a side view of a decorative display apparatus, according to an embodiment.

FIG. 5 illustrates a side view of a decorative display apparatus 500, including a body 510 with a side-mounted cavity 512, according to an embodiment. The cavity 512 is vertically oriented, extending along the length of the body 510 and positioned on a side of the body 510. With a precision-cut opening above, users can insert a planter or other item into the cavity 512, and the plant can maintain an upright alignment without obstruction by the body 510. This configuration allows for unimpeded plant growth by preserving the plant's upright vertical alignment. In an embodiment, the precision-cut opening above the cavity 512 may involve a missing segment or piece serving as the cutout, as shown in this figure. Another embodiment may feature a cutout with a specific shape or configuration. Various shapes for the cutout above the cavity are provided in additional embodiments, such as a circular cutout in an embodiment or a rectangular cutout in another. In yet another embodiment, a custom-shaped cutout may be included.

Figure 6:
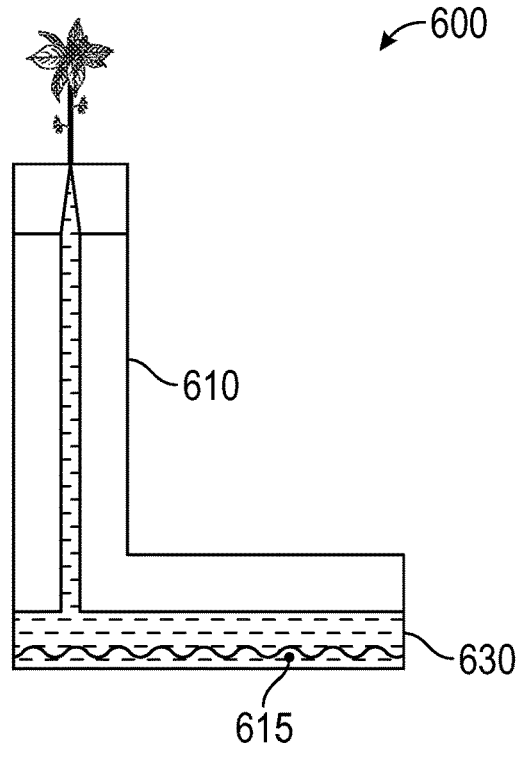
FIG. 6 illustrates a side view of a drainage receptacle of a decorative display apparatus, according to an embodiment.

FIG. 6 illustrates a side view of a drainage receptacle 630 attached to a body 610 of a decorative display apparatus 600, according to an embodiment. The drainage receptacle 630 may be configured to securely attach to a lower part or surface of the body 610. The drainage receptacle 630 may be constructed from durable materials, so that it can withstand various environmental conditions, especially when the decorative display apparatus 600 is used outdoors. In an embodiment, the drainage receptacle 630 may be transparent or translucent to allow visual monitoring of water levels without disassembly. Additionally, a removable cap 615, twisted onto a neck formed on the drainage receptacle 630, may provide users with access for cleaning, removing water, or adjusting water levels. The drainage receptacle 630 can enhance the overall design of the decorative display apparatus by incorporating decorative patterns, textures, or color variations. It can be integrated seamlessly as a part of the overall body.

The drainage receptacle 630 of the apparatus may include various overflow systems to effectively manage excess water, which is particularly beneficial for outdoor use. In an embodiment, drainage holes or slots near the top rim of the receptacle 630 allow water to escape once it reaches a specific level. Additionally, a raised lip along the edge of the drainage receptacle 630 acts as a barrier, directing water away from the main opening and preventing overflow. Internal structures, such as integrated diverters or angled channels, may be included to guide excess water within the receptacle to exit points. An adjustable overflow valve may be included in the drainage receptacle 630 to give users control over the water level at which overflow occurs. Furthermore, a self-regulating siphon system can be integrated into the drainage receptacle 630 to draw off excess water and maintain a consistent water level. These overflow mechanisms not only prevent spillage but also contribute to efficient water management.

Figure 7:
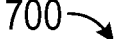
FIG. 7 is a decorative display apparatus shaped into a word, according to an embodiment.
Figure 7:
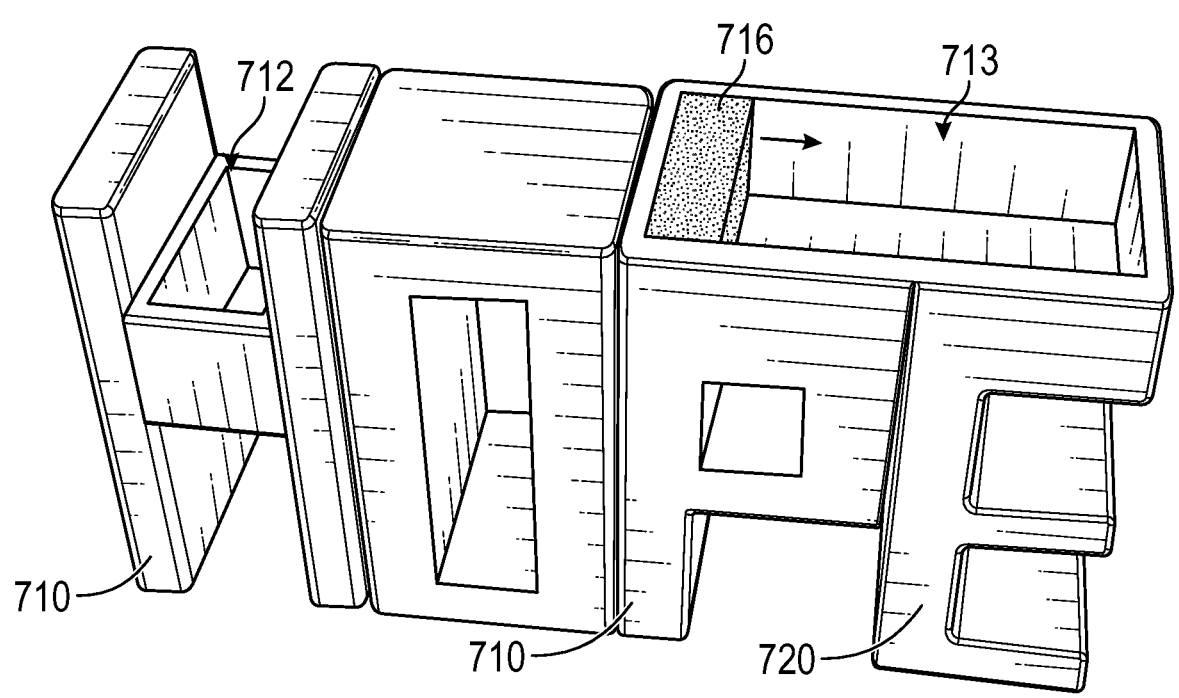

FIG. 7 shows a decorative display apparatus 700 including a body 710 shaped into the word "HOPE," according to an embodiment. The apparatus may include a cavity for each letter—a first cavity 712 for the letter "H" and a second cavity 713 for the letters "P" and "E." These cavities may be positioned at different heights relative to a supporting surface on which the apparatus is resting. Specifically, the first cavity 712 is lower and closer to the surface, while the second cavity 713 is higher above the first cavity 712. This difference in cavity height serves to stabilize and balance the decorative display apparatus 700. The lower placement of the first cavity 712 acts as a stabilizing anchor, while the higher position of the second cavity 713 serves as a counterbalance, minimizing the risk of tipping or instability. In an embodiment, the cavities may have different orientations. For example, the first cavity 712 may be oriented perpendicular to the second cavity 713. The choice of cavity orientation may be chosen according to the shape of the body 710, whether it represents a word or another design element.

In an embodiment, the decorative display apparatus 700 may include a first body 710 (e.g., letter "P") and a second body 720 (e.g., letter "E"). The first body 710 may include a portion of a first cavity, and the second body 720 may include a portion of a second cavity. When the bodies are combined, the cavities may integrate to form a single, common cavity. Additionally, the first body 710 may include a first channel, and the second body 720 may include a second channel. Upon combining the first and second bodies, the first and second channels may merge to form a single, common channel. In an embodiment, each channel may be flexible, such as tubes, with connectors, to allow a user to connect the channels when joining the first and second bodies together. The connected tubes may be concealed within the integrated body of the decorative display apparatus 700.

Additionally, in an embodiment, the decorative display apparatus 700 may include a closable cover 716 hingedly or slideably attached to the body 710. For instance, sliding rails, grooves, or channels may integrated into the body of the decorative display apparatus 700. The cover 716 may be configured to open and close the first cavity 712 or second cavity 713. The closable cover may protect the contents within or the walls of the cavities from external elements such as dost, debris, or environmental factors. The decorative display apparatus 700 may further include an adjustable partition within the cavity 712. The adjustable partition may include a flexible organizational element to allow users to customize the internal space of the cavity 712 based on the specific dimensions and arrangements of different planters. This component may be particularly beneficial when dealing with planters of varying sizes or when users wish to create specific aesthetic arrangements within the display. The adjustable partition may include a variety of suitable partitions including sliding panels, modular dividers, or adjustable grids.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. An apparatus, comprising:
two or more bodies shaped in the form of a combination of alphanumeric characters forming a word, a symbol, an emblem, or an image; wherein one body of the two or more bodies comprises:
   a cavity configured to hold a planter therein, wherein the cavity is embedded within the one body of the two or more bodies at an uppermost part thereof;
   a channel connected to an opening at a base of the cavity, wherein the channel extends downward to a section of the one body of the two or more bodies proximal to a supporting surface on which the apparatus is resting;
wherein;
   the one body of the two or more bodies comprises a connection mechanism configured to connect the two or more bodies together to create a visual display;
   the visual display is configured to spell out a word, a message, an alphanumeric sequence, numeric sequence, or symbolic sequence;
   the connection mechanism of the one body of the two or more bodies is configured to facilitate rearrangement thereof to create various visual displays, wherein the connection mechanism comprises:
      a mateably engageable connector comprising an articulating mechanism configured to facilitate movement between the respective bodies at various angles to form interconnected shapes, symbols, emblems, images, or geometric patterns; and
a drainage receptacle detachable from the one body of the two or more bodies, wherein liquid unabsorbed by the planter flows from the cavity through the channel into the drainage receptacle.

2. The apparatus of claim 1, further comprising an articulating joint detachably configured to couple the two or more bodies together, wherein the articulating joint detachably enables the connected respective bodies to be moved at various angles relative to each other.

3. The apparatus of claim 1, wherein:
the one body of the two or more bodies comprises a first connector comprising a protrusion;
a second body of the two or more bodies comprises a second connector comprising a recessed groove; and
the first connector and second connector are mateably engageable to form a snap-fit assembly.

4. The apparatus of claim 1, wherein the cavity comprises:
a first wall and a second wall arranged parallel to each other;
a third wall and a fourth wall;
   wherein in the third wall and the fourth wall are opposite each other and perpendicular to the first and second wall;
the third and fourth walls are inwardly-slanted walls; and
the inwardly-slanted walls are configured to guide excess liquid away from the planter through the opening at the base of the cavity.

5. The apparatus of claim 4, wherein the first, second, third, or fourth wall comprises a hydrophobic, anti-stain, ceramic, nano-coating, polymer, or epoxy coating.

6. The apparatus of claim 1, wherein:
a second body comprises a second cavity configured to hold a second planter therein;
the cavity is positioned lower and in closer proximity to the supporting surface on which the apparatus is resting; and
the second cavity is positioned above the cavity with respect to the supporting surface.

7. An apparatus, comprising:
two or more bodies shaped in the form of a combination of alphanumeric characters forming a word, a symbol, an emblem, or an image;
wherein one body of the two or more bodies comprises:
   a cavity configured to hold a planter therein, wherein the cavity is embedded within the one body of the two or more bodies at an uppermost part thereof;
   a channel detachably connected to an opening at a base of the cavity, wherein the channel extends down to a lower part of the one body of the two or more bodies;
   a drainage receptacle detachably attachable to the lower part of the one body of the two or more bodies, wherein liquid unabsorbed by the planter travels from the cavity through the channel into the drainage receptacle;
   wherein the one body of the two or more bodies comprises a connection mechanism configured to connect to the two or more bodies together to create a visual display, wherein the visual display is configured to spell out a word, a message, an alphanumeric sequence, or numeric sequence; wherein the connection mechanism of the one body of the two or more bodies is configured to facilitate rearrangement thereof to create various visual displays;
      wherein the connection mechanism comprises:
         mateably engageable connectors with articulating mechanisms configured to enable movement between the respective bodies at various angles such that the two or more bodies together are configured to form interconnected shapes or geometric patterns; and
   wherein the drainage receptacle is detachable from the lower part of the one body of the two or more bodies, wherein liquid unabsorbed by the planter travels from the cavity through the channel into the drainage receptacle.

8. The apparatus of claim 7, wherein the two or more bodies are configured to connect to respective bodies, and, wherein the two or more bodies are configured to be interchangeable.

9. The apparatus of claim 8, wherein:
one body of the two or more bodies comprises a first connector comprising a magnet;
a second body of the two or more bodies comprises a second connector comprising a magnetic surface; and
the first connector and second connector are mateably engageable to form a magnetic snap-fit assembly.

10. The apparatus of claim 7, wherein the one body of the two or more bodies is a transparent body configured to allow ambient light to pass through and illuminate the planter contained within the cavity.

11. The apparatus of claim 7, wherein the drainage receptacle is configured to redirect excess liquid away from the cavity to prevent spillage.

12. The apparatus of claim 11, wherein the drainage receptacle further comprises a drainage hole or slot near a top rim of the drainage receptacle for controlled release of the excess liquid in the drainage receptacle.

\* \* \* \* \*